(12) United States Patent
Tracy

(10) Patent No.: US 6,314,910 B1
(45) Date of Patent: Nov. 13, 2001

(54) AIR-ACTIVATED FISH FEEDER

(76) Inventor: Mark E. Tracy, 5225 E. Charleston Bl. #2106, Las Vegas, NV (US) 89142

(*) Notice: Subject to any disclaimer, the term of this patent is extended or adjusted under 35 U.S.C. 154(b) by 0 days.

(21) Appl. No.: 09/487,443

(22) Filed: Jan. 19, 2000

Related U.S. Application Data

(60) Provisional application No. 60/118,169, filed on Feb. 1, 1999.

(51) Int. Cl.[7] .................................................. A01K 61/02
(52) U.S. Cl. ..................... 119/51.04; 119/230; 119/263
(58) Field of Search ........................ 119/51.04, 51.11, 119/246, 247, 248, 251, 230, 256, 263, 264; 222/195, 630

(56) References Cited

U.S. PATENT DOCUMENTS

| | | | |
|---|---|---|---|
| 5,140,943 | * 8/1992 | Nearhoff | 119/51.04 |
| 5,568,790 | * 10/1996 | Musgrave | 119/217 |
| 5,709,319 | * 1/1998 | Yao | 222/170 |
| 5,791,285 | * 8/1998 | Johnson | 119/51.04 |
| 5,957,085 | * 9/1999 | Youngstrom et al. | 119/246 |

* cited by examiner

Primary Examiner—Charles T. Jordan
Assistant Examiner—Yvonne R. Abbott
(74) Attorney, Agent, or Firm—Quirk & Tratos

(57) ABSTRACT

A fish feeding mechanism that disburses fish food within a fish tank in metered quantities, allowing fish the time to consume the food before it settles. The feeding mechanism is affixed to the inside of the fish tank by a suction cup or a suspension hook and comprises a food container whose top end is positioned above the water surface. The submerged surface end of the food container includes at least one food outlet that opens into the fish tank. Adjacent to the food container and also submerged inside the fish tank is a lift tube provided with an inlet port to allow water from the fish tank to enter, while a channel in the lift tube allows the water to enter the food container. An air line is inserted into the lift tube's inlet port and the compressed air therefrom flows from the mouth of the air line and enters the lift tube, causing air bubbles to rise to create an upward current of water.

7 Claims, 3 Drawing Sheets

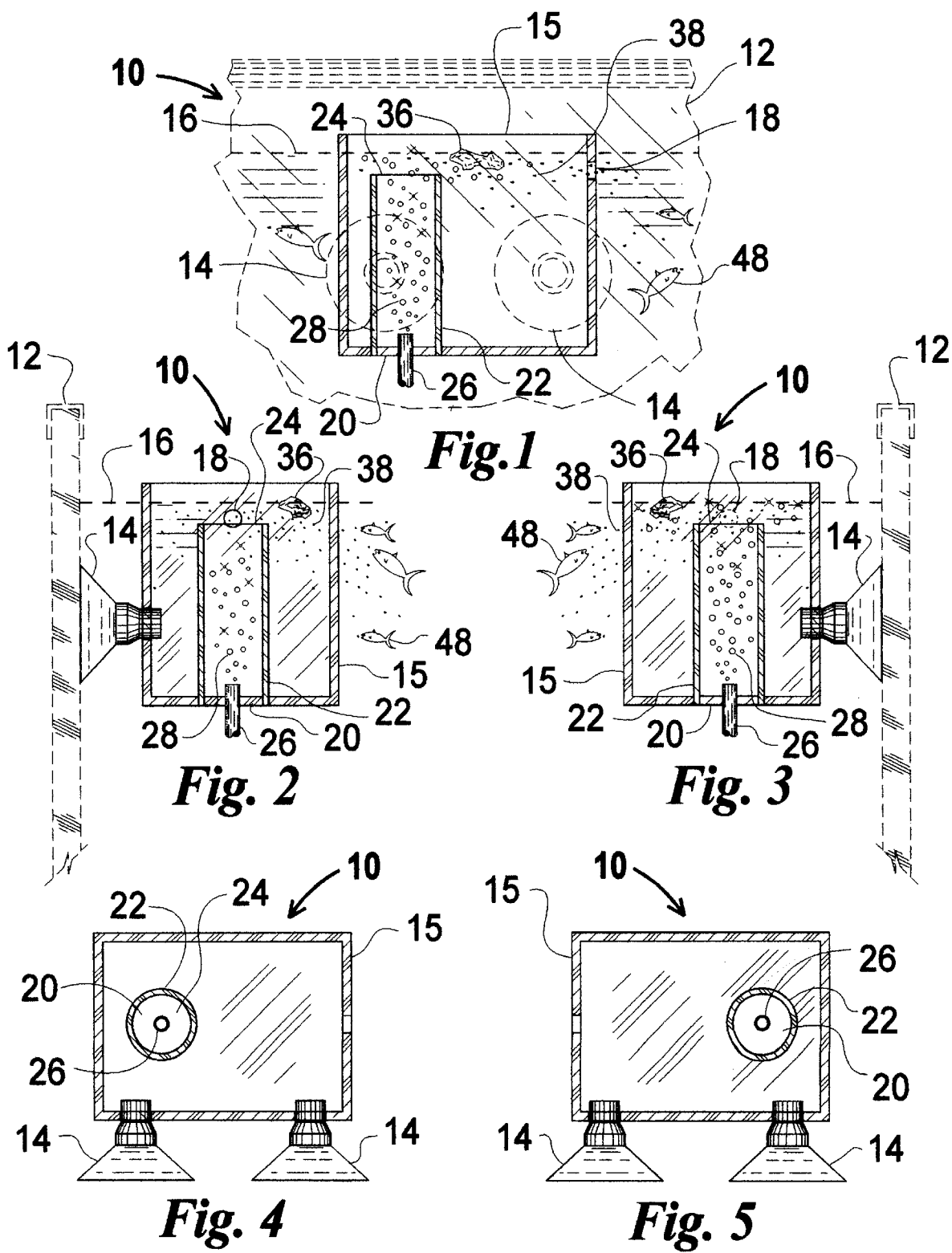

AIR-ACTIVATED FISH FEEDER

This application claims the benefit under 35 USC 119(e) of Provisional Application No. 60/118,169 filed Feb. 1, 1999 has been inserted.

BACKGROUND OF THE INVENTION

1. Field of the Invention

The present invention is a mechanism that utilizes compressed air to feed aquarium fish.

2. Description of the Prior Art

Heretofore, devices that employed compressed air to feed aquarium fish have suffered from some shortcomings. For example, in a device described by Muller (U.S. Pat. No. 4,400,399), fish are required to enter a "feeding station" in order to feed. Since the feeding station lies within the parameters of the device, one problem with Muller's invention is that aggressive and dominant fish can prevent less aggressive fish from feeding by excluding these fish from the feeding station.

Further, with Muller's invention, there is the problem of feeding certain non-pelletized fish food such as frozen fish food. This is because frozen fish food, after assuming its thawed out (edible) state, becomes light enough that, were such food employed in Muller's device, it would readily drift out of the feeding station and into the aquarium at large at an uncontrollable rate. This would present the problem of fish not having time to consume the food before it settled to the tank's bottom becoming lost between the gravel or grains of sand.

Another air-driven feeding device, Munker (German Patent: DT 2421-626), is deficient in another way. Munker's feeding device relies on in flowing water to keep fish food dispersed and suspended inside a reservoir. Unfortunately, it is unlikely that Munker's system of using only in flowing water (and not bubbles as well) would be enough to keep many popular fish foods from "clumping together" inside the reservoir, as opposed to exiting the reservoir at a preferred, controlled rate.

BRIEF SUMMARY OF THE INVENTION

Accordingly, the object of the present invention is to provide a convenient means for feeding aquarium fish the types of food that do not readily float on top of an aquarium's surface water, such as commercially available frozen fish food, of which frozen brine shrimp is a good example. Such frozen fish food is commonly sold in frozen-together packets.

The usual, current method of feeding frozen fish food calls for first thawing out a chunk of frozen food in a container of water and then slowly pouring the thawed and dispersed pieces of food, along with the water, into the aquarium. Such feeding must be done at a slow enough pace so that the fish have time to eat the food before it settles to the bottom of the aquarium and becomes lost between the gravel or grains of sand. Once embedded in the gravel or sand, the food becomes difficult for the fish to reach, and therefore consume, which not only wastes food, but can also foul the aquarium water with decomposing food.

The present invention saves the aquarist both time and effort by eliminating the need for the aquarist to thaw out the frozen food in water and slowly pour it into the aquarium. Rather, the aquarist need only drop a chunk of frozen food into the feeder's reservoir and the feeder's bubbling-action takes care of the rest—both thawing out and breaking up the chunk of frozen food into individual pieces, and slowly dispersing the food into the tank at a slow enough rate so that the fish have time to eat the food before it sinks to the bottom of the tank.

Further objects and advantages of the present invention will become apparent from a consideration of the drawings and ensuing description.

BRIEF DESCRIPTION OF THE SEVERAL VIEWS OF THE DRAWING

FIG. 1 is a front view of one embodiment of an arrangement for feeding fish;

FIG. 2 is a left view of the arrangement for feeding fish of FIG. 1;

FIG. 3 is a right view of the arrangement for feeding fish of FIG. 1;

FIG. 4 is a top view of the arrangement for feeding fish of FIG. 1;

FIG. 5 is a bottom view of the arrangement for feeding fish of FIG. 1;

DETAILED DESCRIPTION OF THE INVENTION

Figure 6:
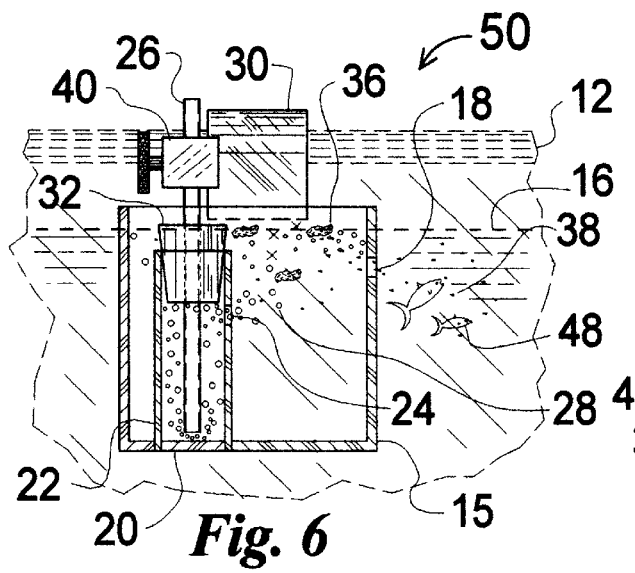
FIG. 6 is a front view of another embodiment of an arrangement for feeding fish.

Referring to FIGS. 1–5, in the preferred embodiment, a fish feeding device 10 is attached to the inside surface of a fish tank 12 by a fastener such as a suction cup 14. The fish feeding device 10 is comprised of a food container 15 whose bottom end lies submerged below the water surface 16 of the fish tank 12. The top, open end of the food container 15 is positioned above the water surface 16. A food outlet 18 opens into the fish tank 12 in the submerged portion of the food container 15. An inlet port 20 connects to a lift tube 22 at the bottom of the food container 15. The top end of the lift tube 22 is open and comprises a channel 24, whereby water from the aquarium 12 enters the food container 15 after the water first enters the inlet port 20 at the bottom end of the lift tube 22.

One end of an air line 26 is connected to a source of compressed air, such as an air pump of a type well known in the art (not shown). The other end of the air line 26 is positioned within the inlet port 20 near the bottom of the lift tube 22. Air moves through the air line 26 and into the inlet port 20 where it forms bubbles 28, which rise inside the lift tube 22 and then enter the food container 15 via the channel 24. Simultaneously, rising bubbles 28 push water through the channel 24 and into the food container 15. Water flowing into the food container 15 eventually flows through the food outlet 18 and back into the fish tank 12.

Figure 7:
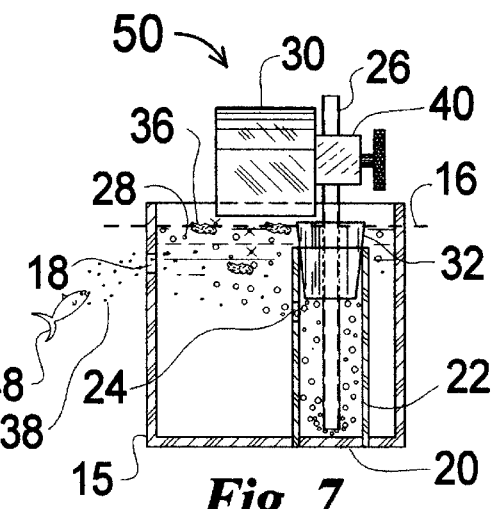
FIG. 7 is a rear view of the arrangement for feeding fish of FIG. 6.
Figure 8:
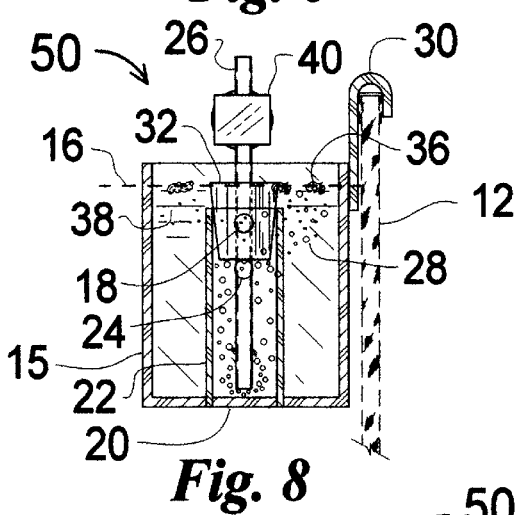
FIG. 8 is a right view of the arrangement for feeding fish of FIG. 6.
Figure 9:
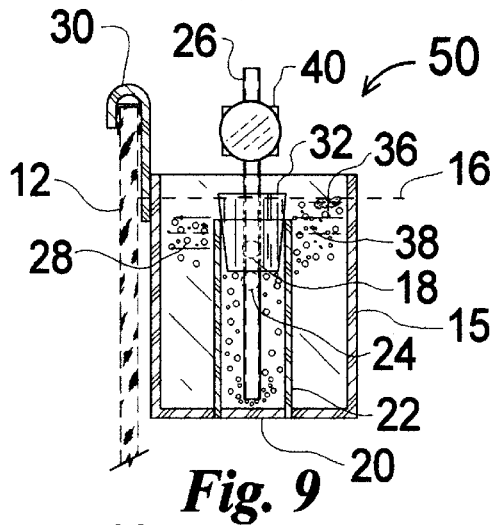
FIG. 9 is a left view of the arrangement for feeding fish of FIG. 6.
Figure 10:
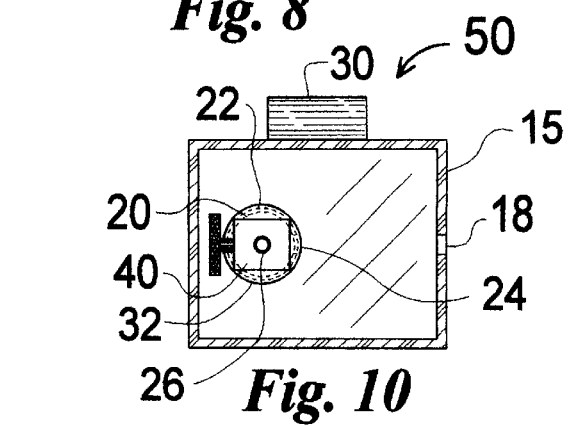
FIG. 10 is a top view of the arrangement for feeding fish of FIG. 6.
Figure 11:
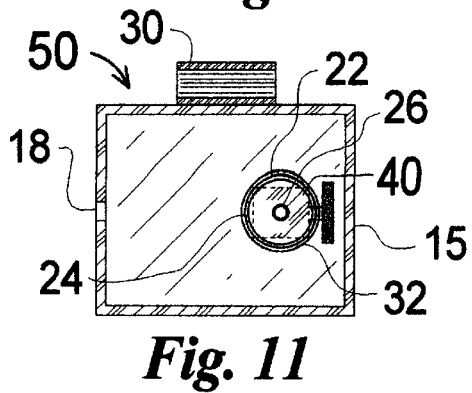
FIG. 11 is a bottom view of the arrangement for feeding fish of FIG. 6.

Referring to FIGS. 6–11 in an alternate embodiment: Rather than a suction cup attachment, as in the previous embodiment, a suspension hook 30 fastener engages with the top of the fish tank 12 to attach the fish feeding device 50 to the inside surface of the fish tank 12. Also, in the embodiment shown in FIGS. 6–11 (unlike the previous embodiment) the top end of the lift tube 22 is not open, but rather is plugged by a stopper 32. The top end of the lift tube 22 could alternately be sealed or closed by a cap, or other such means. The lift tube 22 has a hole that comprises a channel 24, whereby water from the aquarium 12 enters the food container 15 after the water first enters an inlet port 20 at the bottom end of the lift tube 22.

One end of an air line 26 is connected to a source of compressed air. The other end of the air line 26 fits snugly through a hole in the stopper 32 and down inside the lift tube 22. Air moves through the air line 26 and into the inlet port 20 where it forms bubbles 28, which rise inside the lift tube 22 and then enter the food container 15 via the channel 24. Simultaneously, rising bubbles 28 push water through the channel 24 and into the food container 15. Water flowing into the food container 15 eventually flows through the food outlet 18 and back into the fish tank 12.

Figure 12:
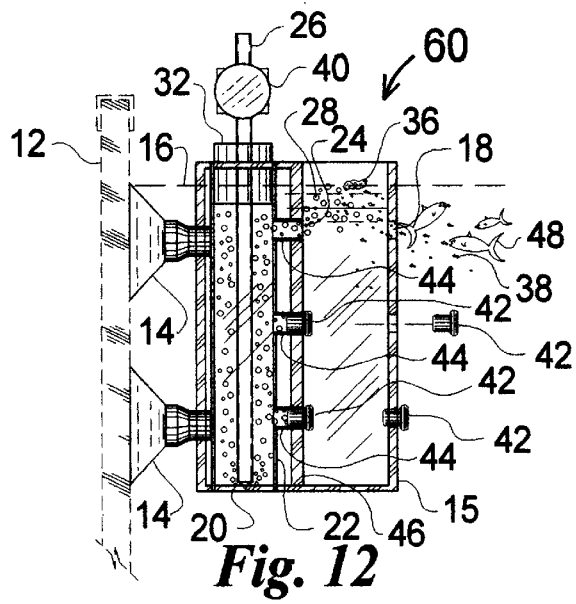
FIG. 12 is a left view of another embodiment of an arrangement for feeding fish.
Figure 13:
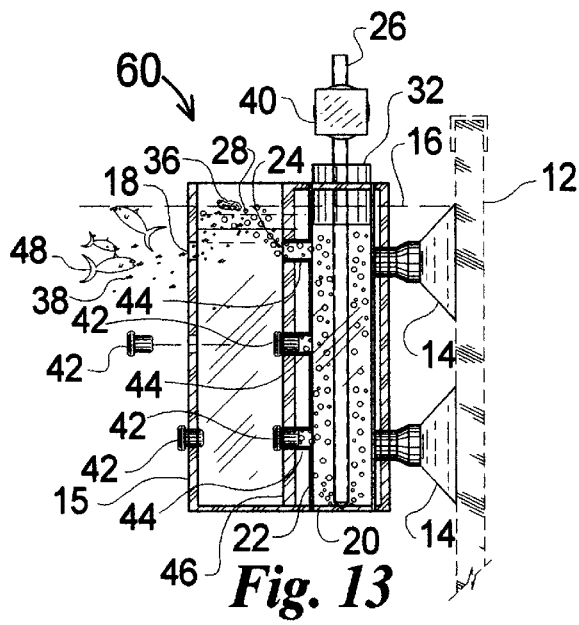
FIG. 13 is a right view of the arrangement for feeding fish of FIG. 12.
Figure 14:
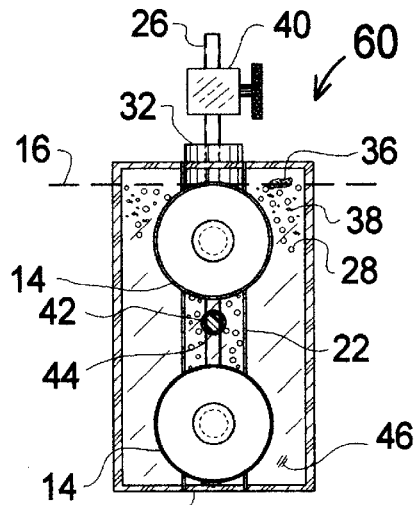
FIG. 14 is a rear view of the arrangement for feeding fish of FIG. 12.
Figure 15:
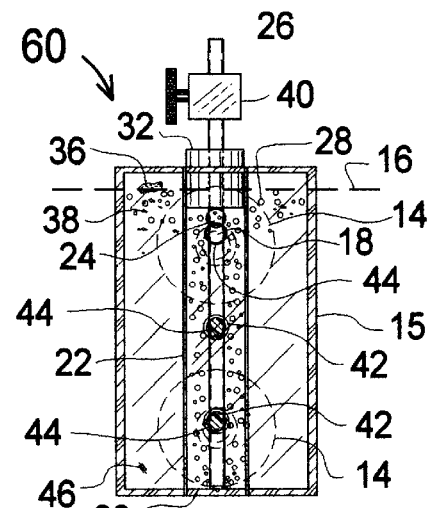
FIG. 15 is a front view of the arrangement for feeding fish of FIG. 12.
Figure 16:
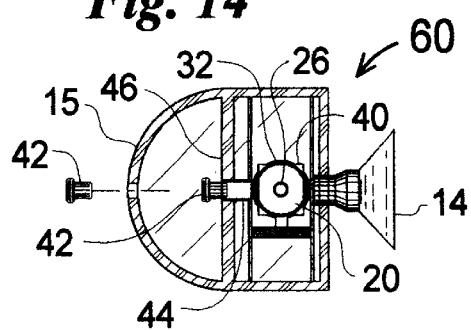
FIG. 16 is a top view of the arrangement for feeding fish of FIG. 12.
Figure 17:
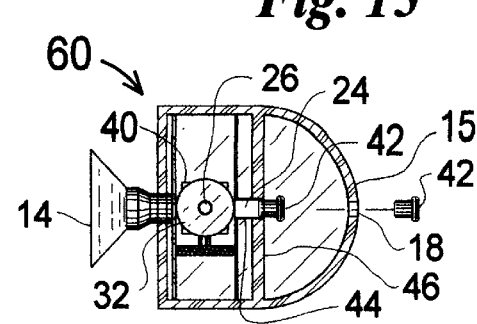
FIG. 17 is a bottom view of the arrangement for feeding fish of FIG. 12.

Referring to FIGS. 12–17: In this embodiment of the fish feeding device 60, the lift tube 22 lies outside the food container 15—the lift tube 22 being separated from the food container 15 by a wall 46. A plurality of conduits 44 connect the lift tube 22 to the food container 15 and comprise channels 24, whereby water enters the food container 15 after the water first enters an inlet port 20 at the bottom end of the lift tube 22.

Plugs 42 are provided so that the aquarist can plug any chosen channels 24 to determine which of the plurality of channels 24 will be utilized. In this manner, the aquarist can choose the level that bubbles 28 and water enter the food container 15 and, in so doing, affect the degree of agitation of the water in the food container 15. By controlling the amount of agitation, the aquarist can help keep pieces of fish food 38 properly dispersed and suspended in the water within the food container 15. (This arrangement of a plurality of channels 24 and plugs 42 could also be incorporated into the embodiment of FIGS. 6–11.)

In FIGS. 12–17, instead of just one food outlet, the invention contains a plurality of food outlets 18. Again plugs 42 are provided so that the aquarist can plug any chosen food outlet 18 and, thereby, regulate the delivery of fish food 38 into the aquarium 12. This arrangement of a plurality of food outlets 18 and plugs 42 could also be incorporated into all of the previously disclosed embodiments.

In FIGS. 12–17, one end of an air line 26 is attached to a source of compressed air. The other end of the air line 26 fits snugly through a hole in the stopper 32 and down inside the lift tube 22. Air moves through the air line 26 and into the inlet port 20 where it forms bubbles 28, which rise inside the lift tube 22 and then enter the food container 15 via any unplugged channels 24. Simultaneously, rising bubbles 28 push water through the unplugged channels 24 and into the food container 15. Water flowing into the food container 15 eventually flows through the unplugged food outlets 18 and back into the fish tank 12.

To utilize the present invention, in any of the different embodiments, the aquarist first drops fish food into the top open end of the food container 15. In the case of commercially available frozen fish food, the aquarist drops a chunk of frozen food 36 into the food container 15. Next, the frozen food 36 thaws out and is broken up into individual pieces of food 38 by bubbles 28, whereby pieces of food 38 are dispersed and suspended in the water within the food container 15. Gradually, pieces of food 38 follow the flow of water through any unplugged food outlets 18 and into the aquarium 12 for the fish 48 to eat.

In all of the embodiments shown in FIGS. 1–17, the aperture of the food outlet, or outlets 18, is adjustable so that the aquarist can more precisely regulate how quickly fish food 38 is delivered into the aquarium 12. Also, as shown in FIGS. 1–17, the device is equipped with a regulating valve 40, whereby the aquarist can adjust the air flow into the inlet port 20 and, hence, adjust the air/water flow into the food container 15, thereby controlling the rate at which fish food 38 enters the fish tank 12.

While I have shown and described certain embodiments of the present invention, it is to be understood that the present invention is subject to many modifications without departing from the spirit and scope of the appended claims.

I claim:

1. A device that controls the delivery and disbursement of the type of fish food that does not readily float on top of water inside a fish tank, said device comprising:

a food container immersible partly into said fish tank and defined by a peripheral surface surrounding a lower surface to form a hollow enclosure open at the top;

means for filling said food container with fish food;

a lift tube extending from said lower surface wherein at least one channel in said lift tube opens into said food container;

at least one food outlet in said peripheral surface of said food container below the level of immersion thereof;

an air pump to supply a source of compresses air;

means to connect said air pump to the lift tube, whereby said lift tube is supplied with said source of compressed air through said lower surface, wherein bubbles rise inside the lift tube and exit the channel in said lift tube causing bubbles and water to enter said food container proximate the top thereof creating a flow of water into the container, whereby food in said container gets caught up in the flow of water, and water and food are dispersed into the fish tank through said food outlet in the container.

2. The device according to claim 1, whereby said source of compressed air is connected to an air line whose air flow is adjusted by a regulator valve.

3. The device according to claim 1, whereby a fastening means is provided to mount said container to the fish tank.

4. The device according to claim 1 wherein said food outlet of the container is adjustable in size to provide a means to regulate the flow of water and food into the fish tank.

5. The device according to claim 1 wherein said food outlet includes a plurality of apertures selectively cleared by a plug means provided to plug different ones of said apertures to determine which of the plurality of food outlets will be utilized, and thereby regulate the flow of water and food into the fish tank.

6. The device according to claim 1, comprising a plurality of channels in said lift tube that open into the container.

7. The device according to claim 6, whereby a plug means is provided to plug different channels in said lift tube, to determine which of the plurality of channels will be utilized, and therein determine the level that bubbles and water enter said container, to affect the level of agitation of water in said container, and thereby help keep fish food properly suspended.

* * * * *